(12) United States Patent
Fukumura

(10) Patent No.: US 9,945,430 B2
(45) Date of Patent: Apr. 17, 2018

(54) ELECTROMAGNETIC CLUTCH

(71) Applicant: DENSO CORPORATION, Kariya, Aichi-pref. (JP)

(72) Inventor: Yoshinori Fukumura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/317,511

(22) PCT Filed: Nov. 26, 2015

(86) PCT No.: PCT/JP2015/005874
§ 371 (c)(1),
(2) Date: Dec. 9, 2016

(87) PCT Pub. No.: WO2016/088341
PCT Pub. Date: Jun. 9, 2016

(65) Prior Publication Data
US 2017/0108057 A1 Apr. 20, 2017

(30) Foreign Application Priority Data
Dec. 5, 2014 (JP) ................................ 2014-246953

(51) Int. Cl.
| F16D 27/06 | (2006.01) |
| F16D 27/14 | (2006.01) |
| F16H 7/08 | (2006.01) |
| F16D 28/00 | (2006.01) |

(52) U.S. Cl.
CPC ............. *F16D 27/06* (2013.01); *F16D 27/14* (2013.01); *F16H 7/0827* (2013.01); *F16D 28/00* (2013.01); *F16D 2300/18* (2013.01)

(58) Field of Classification Search
None
See application file for complete search history.

(56) References Cited

U.S. PATENT DOCUMENTS

| 5,941,357 A | 8/1999 | Tabuchi et al. |
| 5,967,282 A * | 10/1999 | Takahashi ............. F16D 27/112 192/84.961 |
| 5,984,069 A | 11/1999 | Takahashi |
| 2015/0345573 A1 | 12/2015 | Fukumura et al. |

* cited by examiner

*Primary Examiner* — Mark A Manley
(74) *Attorney, Agent, or Firm* — POSZ LAW GROUP, PLC

(57) ABSTRACT

A thermal fuse is covered with a case that has a slit. A capacity of the case is larger than a volume of the thermal fuse, and the case has a space that is formed between an inner wall surface of the case and the thermal fuse. The slit is formed in the case introduce radiant heat, which is generated at a friction surface of a rotor, into an inside of the case. Thereby, the radiant heat, which is inputted into the inside of the case through the slit, can be reflected by the inner wall surface of the case and thereafter can be absorbed by the thermal fuse.

7 Claims, 6 Drawing Sheets

ELECTROMAGNETIC CLUTCH

CROSS REFERENCE TO RELATED APPLICATIONS

This application is a U.S. national stage of International Patent Application No. PCT/JP2015/005874 filed on Nov. 26, 2015 and is based on and incorporates herein by reference Japanese Patent Application No. 2014-246953 filed on Dec. 5, 2014.

TECHNICAL FIELD

The present disclosure relates to an electromagnetic clutch.

BACKGROUND ART

The patent literature 1 discloses an electromagnetic clutch that has a thermal fuse. When a compressor is locked, the thermal fuse is melted and is open-circuited by frictional heat, which is generated between a friction surface of an armature and a friction surface of a rotor. Thus, supply of an electric current to an electromagnetic coil is blocked, and thereby the electromagnetic clutch is placed into a drive-force-blocking state.

In the electromagnetic clutch recited in the patent literature 1, a portion of the thermal fuse is exposed from a resin member, which holds the thermal fuse, so that radiant heat, which is generated at the friction surface of the rotor, can reach the thermal fuse.

However, even when the radiant heat reaches the thermal fuse, a portion of the radiant heat, which has reached the thermal fuse, is reflected by and is escaped from the thermal fuse without being absorbed by the thermal fuse. Thus, in order to improve the responsiveness of the thermal fuse, it is desirable that the radiant heat, which is reflected by the thermal fuse, is absorbed by the thermal fuse.

CITATION LIST

Patent Literature

PATENT LITERATURE 1: JP2014-159873A

SUMMARY OF INVENTION

The present disclosure is made in view of the above point, and thereby it is an objective of the present disclosure to provide an electromagnetic clutch that can improve responsiveness a thermal fuse in comparison to the prior art technique.

In order to achieve the above objective, an electromagnetic clutch of the present disclosure includes an electromagnetic coil, a rotor, an armature, a stator, a resin member, a case and a thermal fuse. The electromagnetic coil generates an electromagnetic attractive force when the electromagnetic coil is energized. The rotor is rotated about a rotation center axis when the rotor receives a rotational drive force from a drive source. The rotor includes a first surface and a second surface, which are spaced away from each other in an axial direction of the rotation center axis, and the first surface and the second surface extend in a direction perpendicular to the axial direction. The armature is connectable with a rotatable shaft of a driven-side device. The armature is attracted to and attached to the first surface of the rotor by the electromagnetic attractive force when the electromagnetic coil is energized. The armature is detached from the first surface of the rotor when the electromagnetic coil is not energized. The stator is opposed to the second surface of the rotor in the axial direction and forms a space between the stator and the second surface. The stator has an opening on a side wherein the second surface is located. The stator receives the electromagnetic coil in an inside space of the stator, which is communicated with the opening. The resin member closes the opening of the stator and seals the electromagnetic coil in the inside space of the stator. The case is held by a portion of the resin member, which is located in the opening of the stator. The thermal fuse is received in an inside of the case and cuts supply of an electric current to the electromagnetic coil when a temperature of the thermal fuse is equal to or higher than a predetermined temperature.

The case has a gap, through which radiant heat generated at the first surface of the rotor is introduced into the inside of the case. A capacity of the case is larger than a volume of the thermal fuse, and the case has a space between an inner wall surface of the case and the thermal fuse.

As discussed above, according to the present disclosure, the thermal fuse is covered with the case. Therefore, the radiant heat, which is inputted into the inside of the case through the gap of the case and is reflected by the thermal fuse after reaching the thermal fuse, is reflected by the inner wall surface of the case and reaches the thermal fuse once again. By repeating the reflection of the radiant heat at the thermal fuse and the reflection of the radiant heat at the inner wall surface of the case, the radiant heat is finally absorbed by the thermal fuse.

Thus, according to the present disclosure, the radiant heat, which is reflected by the thermal fuse, can be absorbed by the thermal fuse. Therefore, in comparison to the prior art technique, in which the radiant heat reflected by the thermal fuse is escaped from the thermal fuse, the responsiveness of the thermal fuse can be improved.

DESCRIPTION OF EMBODIMENTS

Figure 1:
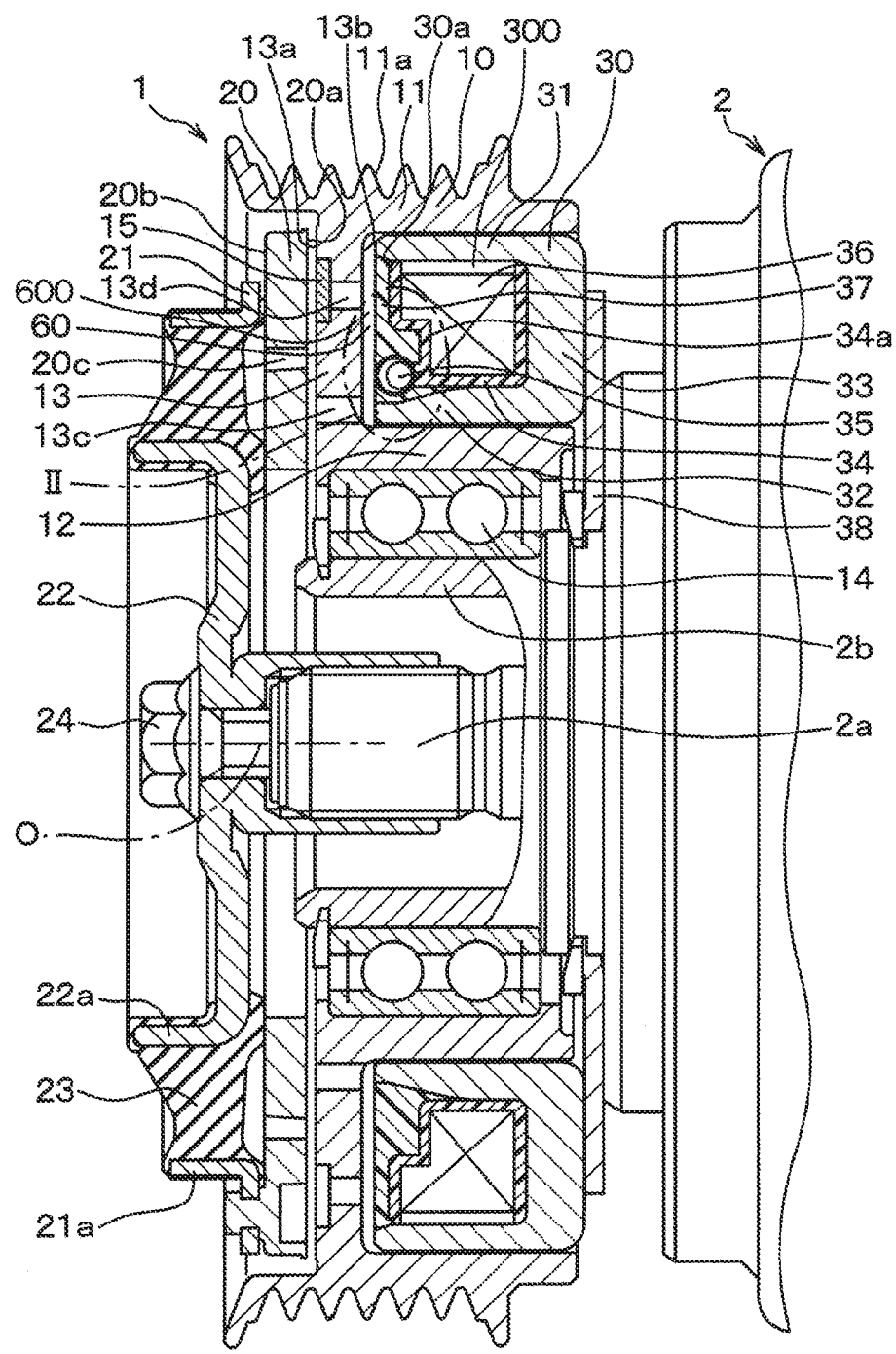
FIG. 1 is a cross-sectional view showing a structure of an electromagnetic clutch according to a first embodiment.

Hereinafter, embodiments of the present disclosure will be described with reference to the accompanying drawings. In each of the following embodiments, the same or similar portions are indicated by the same reference numerals.

First Embodiment

An electromagnetic clutch 1 of a first embodiment shown in FIG. 1 is implemented by applying a principle of the present disclosure to a clutch mechanism of a compressor 2 that rotates a compression mechanism upon receiving a rotational drive force from an engine, which serves as a drive source that outputs a vehicle drive force. Therefore, in the present embodiment, the engine serves as a drive source, and the compressor 2 serves as a driven-side device.

The compressor 2 suctions and compresses refrigerant. The compressor 2 cooperates with a radiator, an expansion valve, and an evaporator to form a refrigeration cycle system of a vehicle air conditioning system. The radiator radiates heat from the refrigerant, which is discharged from the compressor 2. The expansion valve depressurizes and expands the refrigerant, which is outputted from the radiator. The evaporator evaporates the refrigerant, which is depressurized by the expansion valve, to implement heat absorption.

The electromagnetic clutch 1 includes a rotor 10 and an armature 20. The rotor 10 forms a driving-side rotatable body, which is rotated about a rotation center axis O thereof when the rotor 10 receives the rotational drive force from the engine. The armature 20 forms a driven-side rotatable body, which is connected to a rotatable shaft 2a of the compressor 2. When the rotor 10 and the armature 20 are coupled with each other, conduction of the rotational drive force from the engine to the compressor 2 is enabled. In contrast, when the rotor 10 and the armature 20 are decoupled from each other, the conduction of the rotational drive force from the engine to the compressor 2 is disabled. FIG. 1 shows a state where the rotor 10 and the armature 20 are decoupled from each other.

That is, when the electromagnetic clutch 1 couples between the rotor 10 and the armature 20, the rotational drive force of the engine is conducted to the compressor 2 to drive the refrigeration cycle system. In contrast, when the electromagnetic clutch 1 decouples between the rotor 10 and the armature 20, the rotational drive force of the engine is not conducted to the compressor 2. Thereby, the refrigeration cycle system is not driven. The operation of the electromagnetic clutch 1 is controlled by a control signal, which is outputted from an air conditioning control device that controls the operation of each corresponding one of the constituent devices of the refrigeration cycle system.

Now, a specific structure of the electromagnetic clutch 1 will be described. As shown in FIG. 1, the electromagnetic clutch 1 includes the rotor 10, the armature 20 and the stator 30.

The rotor 10 is a double cylindrical tubular structure, which has an opening on a side that is spaced away from and is opposite from the armature 20, and a cross section of the double cylindrical tubular structure is configured to have a U-shape. Specifically, the rotor 10 includes an outer cylindrical tubular portion 11, an inner cylindrical tubular portion 12 and an end surface portion (a wall portion) 13. The inner cylindrical tubular portion 12 is placed on a radially inner side of the outer cylindrical tubular portion 11. The end surface portion 13 extends in a direction that is perpendicular to the rotation center axis O in such a manner that the end surface portion 13 connects between an end part of the outer cylindrical tubular portion 11 and an end part of the inner cylindrical tubular portion 12, which are located on a side where the armature 20 is located. The outer cylindrical tubular portion 11, the inner cylindrical tubular portion 12, and the end surface portion 13 are made of a magnetic material (e.g., an iron material).

The outer cylindrical tubular portion 11 and the inner cylindrical tubular portion 12 are arranged coaxially with the rotatable shaft 2a of the compressor 2. Specifically, the rotation center axis O of FIG. 1 serves as a rotation center axis of the outer cylindrical tubular portion 11 and of the inner cylindrical tubular portion 12 and also a rotation center axis of the rotatable shaft 2a. A V-groove 11a, around which a V-belt is wound, is formed in an outer peripheral part of the outer cylindrical tubular portion 11. An outer race of a ball bearing 14 is fixed to an inner peripheral part of the inner cylindrical tubular portion 12.

The ball bearing 14 rotatably supports the rotor 10 relative to a housing that forms an outer shell of the compressor 2. Therefore, an inner race of the ball bearing 14 is fixed to a housing boss 2b, which is formed in the housing of the compressor 2.

The end surface portion 13, which serves as the wall portion, includes one end surface 13a and the other end surface 13b, which are located on one side and the other side, respectively, in an axial direction of the rotation center axis O, and these end surfaces 13a, 13b are spaced from each other in the axial direction and extend in a direction that is perpendicular to the axial direction. In the end surface portion 13, magnetic shield slits 13c, 13d, which are respectively configured into an arcuate form and are arranged in two rows in a view taken in the axial direction, are formed. The magnetic shield slits 13c, 13d extend through the end surface portion 13 in the axial direction. The one end surface 13a of the end surface portion 13 is opposed to the armature 20 and is formed as a friction surface of the rotor 10, which contacts the armature 20 when the rotor 10 and the armature 20 are coupled with each other. Thereby, the one end surface 13a of the end surface portion 13 will be also referred to as a friction surface 13a. The friction surface 13a and the and surface 13b of the end surface portion 13 serve as a first surface and a second surface, respectively, of the present disclosure.

In the present embodiment, a friction member 15, which increases a friction coefficient of the end surface portion 13, is placed in a portion of the friction surface 13a of the end surface portion 13. The friction member 15 is made of a non-magnetic material. Specifically, this non-magnetic material may be a material formed by mixing alumina into resin and solidifying the same. Alternatively, the non-magnetic material may be a sintered material of metal powder (e.g., aluminum powder).

The armature 20 is made of a magnetic material (e.g., iron material). The armature 20 is a circular disk member, which extends in the direction perpendicular to the rotation center axis O and has a through-hole that extends in the axial direction of the rotation center axis O through a center part of the circular disk member. The armature 20 includes one end surface 20a and the other end surface 20b, which are located on the one side and the other side, respectively, in the axial direction of the rotation center axis O. A rotational center of the armature 20 is coaxial with the rotatable shaft 2a of the compressor 2. Specifically, the rotation center axis of the armature 20 coincides with the rotation center axis O.

Similar to the end surface portion 13 of the rotor 10, the armature 20 has a plurality of magnetic shield slits 20c, each of which is configured into an arcuate form in the view taken in the axial direction. The magnetic shield slits 20c extend through one end surface 20a and the other end surface 20b of the armature 20. The magnetic shield slits 20c are radially placed between the magnetic shield slits 13c, which are located on the radially inner side in the end surface portion 13, and the magnetic shield slits 13d, which are located on the radially outer side in the end surface portion 13.

The one end surface 20a of the armature 20 is opposed to the friction surface 13a of the rotor 10 and is formed as a friction surface, which contacts the rotor 10 when the rotor 10 and the armature 20 are coupled with each other. The one end surface 20a of the armature 20 will be also referred to as a friction surface 20a of the armature 20. An outer hub 21, which is configured into a generally circular disk form, is fixed to the other end surface 20b of the armature 20.

The outer hub 21 and an inner hub 22 described later form a connecting member, which connects between the armature 20 and the rotatable shaft 2a of the compressor 2. Each of the outer hub 21 and the inner hub 22 includes a cylindrical tubular portion 21a, 22a, which extends in the axial direction of the rotation center axis O. A cylindrical tubular rubber 23, which is a resilient member made of a resilient material (elastomer), is vulcanized and is secured to an inner peripheral surface of the cylindrical tubular portion 21a of the outer hub 21 and an outer peripheral surface of the cylindrical tubular portion 22a of the inner hub 22.

Furthermore, the inner hub 22 is fixed to the rotatable shaft 2a of the compressor 2 when a bolt 24, which is threadably fitted into a threaded screw hole of the rotatable shaft 2a, is tightened. Specifically, the inner hub 22 is configured to be coupleable with the rotatable shaft 2a of the compressor 2.

In this way, the armature 20, the outer hub 21, the rubber 23, the inner hub 22 and the rotatable shaft 2a of the compressor 2 are joined one after another. When the rotor 10 and the armature 20 are coupled with each other, the armature 20, the outer hub 21, the rubber 23, the inner hub 22, and the rotatable shaft 2a of the compressor 2 are rotated together with the rotor 10.

Furthermore, the rubber 23 exerts a resilient force relative to the outer hub 21 in a direction away from the rotor 10. In the decoupled state were the rotor 10 and the armature 20 are decoupled from each other, this resilient force forms a predetermined gap between the friction surface 13a of the rotor 10 and the friction surface 20a of the armature 20 that is joined to the outer hub 21.

The stator 30 is placed in an inside space 600 of the rotor 10, which is surrounded by the outer cylindrical tubular portion 11, the inner cylindrical tubular portion 12 and the end surface portion 13 of the rotor 10. Thereby, the stator 30 is opposed to the other end surface 13b of the end surface portion 13 and forms a space 60 between the stator 30 and the other end surface 13b of the end surface portion 13. The stator 30 is made of a magnetic material (e.g., an iron material) and receives an electromagnetic coil 36 in an inside of the stator 30.

The stator 30 is a double cylindrical tubular structure, which has an opening 30a on the end surface 13b side (friction surface 13a side), and a cross section of the double cylindrical tubular structure is configured to have a U-shape. Specifically, the stator 30 includes an outer cylindrical tubular portion 31, an inner cylindrical tubular portion 32 and an end surface portion 33. The inner cylindrical tubular portion 32 is placed on a radially inner side of the outer cylindrical tubular portion 31. The end surface portion 33 extends in the direction that is perpendicular to the rotation center axis O in such a manner that the end surface portion 33 connects between the end part of the outer cylindrical tubular portion 31 and the end part of the inner cylindrical tubular portion 32, which are located on the side that is spaced away from the end surface 13b of the rotor 10.

A coil spool 34, which is configured into an annular form, and a thermal fuse 35 are received in an inside space 300 of the stator 30, which is communicated with the opening 30a of the stator 30. The coil spool 34 is made of a resin material (e.g., polyamide resin). The electromagnetic coil 36 is wound around the coil spool 34. The thermal fuse 35 is placed at the opening 30a side of the stator 30. In the present embodiment, the thermal fuse 35 is placed in a recess that is formed in an inner peripheral corner of the coil spool 34. The recess is formed by a stepped configuration of a side wall portion 34a of the coil spool 34, which is located on the armature 20 side. The thermal fuse 35 will be described in detail later.

Furthermore, a resin member 37, which seals the electromagnetic coil 36, is placed at the opening 30a side of the stator 30. In this way, the opening 30a of the stator 30 is closed by the resin member 37. Furthermore, the thermal fuse 35 is held by the resin member 37 located at the opening 30a. The resin member 37 is made of, for example, polyamide resin and has a black color.

Furthermore, a stator plate 38 is fixed to the outer side (the right side in FIG. 1) of the end surface portion 33 of the stator 30. The stator 30 is fixed to the housing of the compressor 2 through the stator plate 38.

Next, the operation of the electromagnetic clutch 1, which is constructed in the above-described manner, will be described. When the electromagnetic coil 36 is energized, the armature 20 is magnetically attracted to the friction surface 13a of the rotor 10 by the electromagnetic attractive force generated from the electromagnetic coil 36, so that the rotor 10 and the armature 20 are coupled with each other. Thereby, the rotational drive force is conducted from the engine to the compressor 2.

In contrast, when the supply of the electric power to the electromagnetic coil 36 is stopped, i.e., when the electromagnetic coil 36 is deenergized, the armature 20 is separated from the friction surface 13a of the rotor 10 by the resilient force of the rubber 23. Thereby, the rotational drive force is not conducted from the engine to the compressor 2.

Next, the thermal fuse 35 will be described.

When the rotatable shaft 2a of the compressor 2 is locked during the time of energizing the electromagnetic coil 36, only the rotor 10 is rotated while the armature 20 is not rotated. At the time of locking the rotatable shaft 2a of the compressor 2, the thermal fuse 35 is melted and is thereby open-circuited when the temperature of the thermal fuse 35 becomes equal to or higher than a predetermined temperature by absorbing radiant heat (frictional heat), which is generated by slipping between the friction surface 20a of the armature 20 and the friction surface 13a of the rotor 10, so that the supply of the electric current to the electromagnetic coil 36 is cut to place the electromagnetic clutch 1 into a drive-force-blocking state. The radiant heat, which is generated at the friction surface 13a of the rotor 10, is transmitted through the air and reaches the thermal fuse 35.

Figure 2:
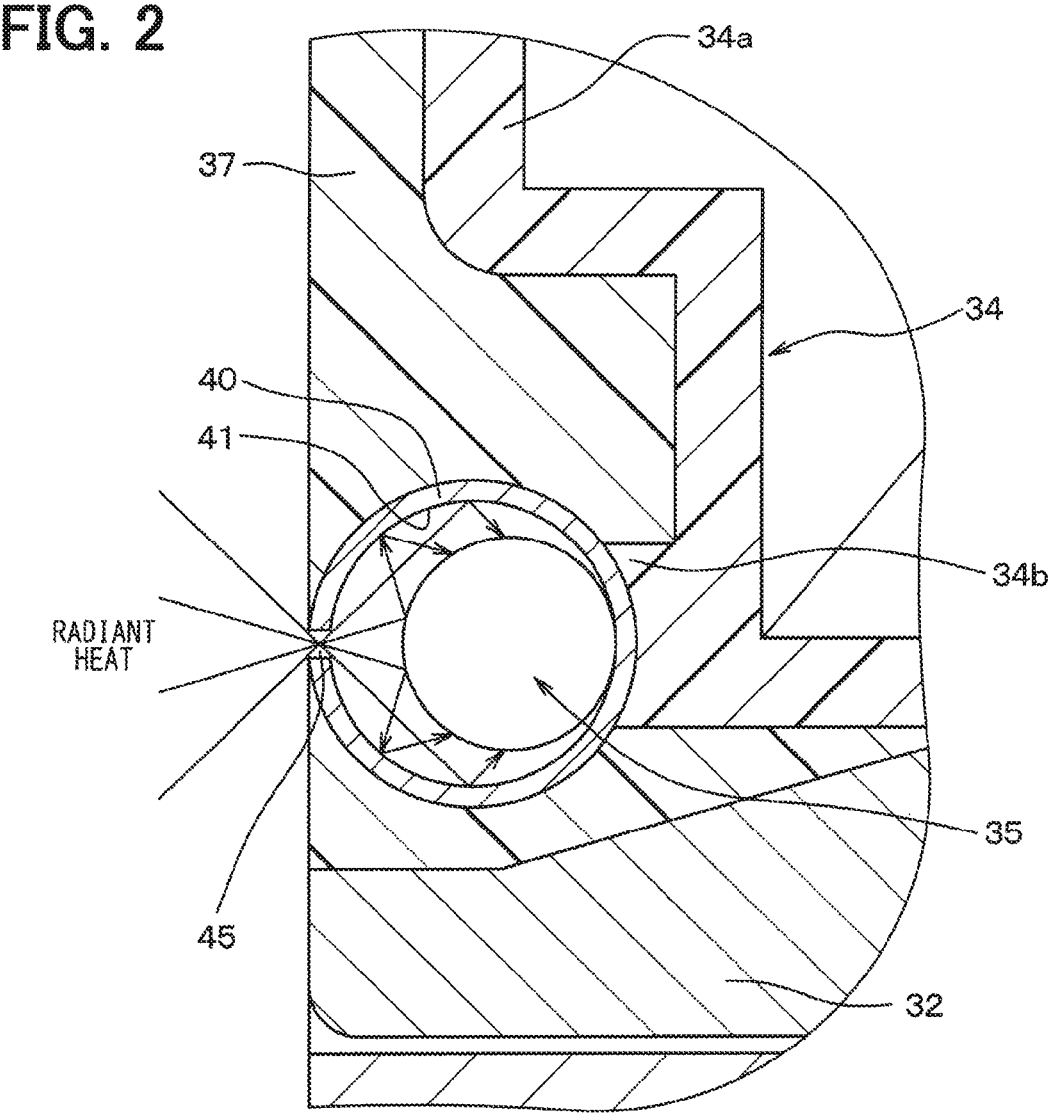
FIG. 2 is an enlarged view of an area II in FIG. 1.

As shown in FIG. 2, the thermal fuse 35 is received in an inside of the case 40 and is thereby covered by the case 40. In the present embodiment, a mount 34b, which serves as a support portion that supports the case 40, is formed at an inner peripheral corner of the coil spool 34. The case 40 is installed to the mount 34b. A portion of the case 40 is covered with the resin member 37, and the case 40 is held by a portion of the resin member 37, which is located at the opening 30a.

Figure 3:
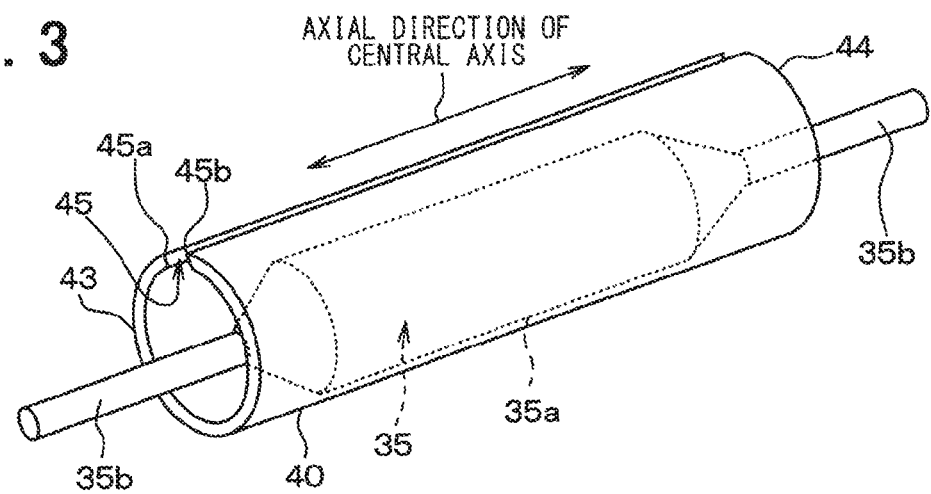
FIG. 3 is a perspective view of a thermal fuse and a case shown in FIG. 1.
Figure 4:
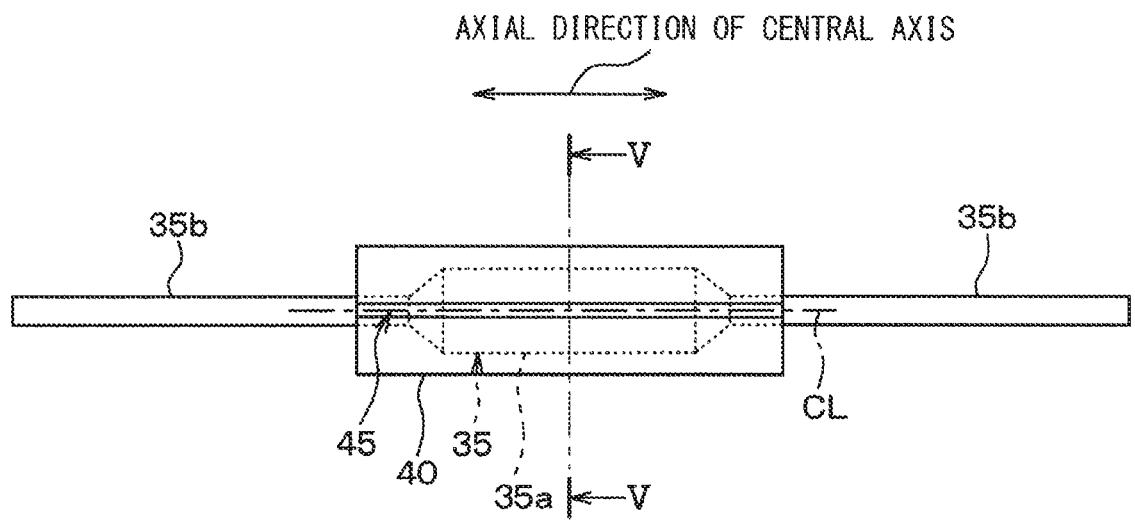
FIG. 4 is a side view of the thermal fuse and the case shown in FIG. 1.
Figure 5:
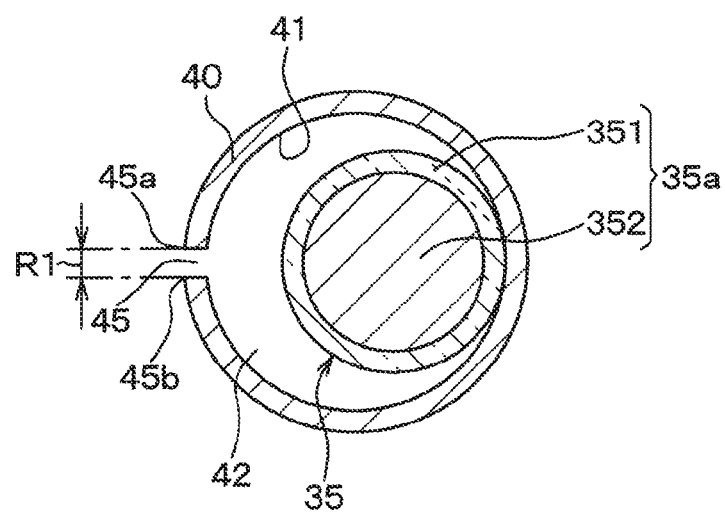
FIG. 5 is a cross sectional view taken along line V-V in FIG. 4.

As shown in FIGS. 3, 4 and 5, the thermal fuse 35 includes a main body portion 35a and two lead wires 35b. The main body portion 35a is shaped into a cylindrical form. The two lead wires 35b are placed at two ends, respectively, of the main body portion 35a, which are opposed to each other in an axial direction of a central axis CL of the main body portion 35a. The lead wires 35b are electrically connected to the electromagnetic coil 36. In the present embodiment, the thermal fuse 35 is a fusible alloy type. Specifically, as shown in FIG. 5, the main body portion 35a of the thermal fuse 35 includes a fuse case 351, which is shaped into a cylindrical tubular form, and a fusible material 352, which is received in an inside of the fuse case 351. The fuse case 351 is made of ceramic, and the fusible material 352 is a low-melting-point alloy. The fuse case 351 has a white color.

As shown in FIGS. 2, 3, 4 and 5, one end 43 and the other end 44 of the case 40, which are opposite to each other in the axial direction of the central axis CL, are both opened, and the case 40 is shaped into a cylindrical tubular form having a cross section that is in a form of a precise circle. Thus, as shown in FIG. 5, an inner wall surface 41 of the case 40 is in a form of a curved surface that is recessed (a form of a recessed curved surface). The shape of the cross section of the case 40 may be another shape, which is other than the precise circle, such as an ellipse or a distorted circle. Even in such a case, the inner wall surface 41 of the case 40 becomes the recessed curved surface. A capacity of the case 40 is larger than a volume of the thermal fuse 35. Furthermore, as shown in FIG. 5, the case 40 has a space 42 that is formed between the inner wall surface 41 of the case 40 and the thermal fuse 35.

The case 40 has a slit 45 in a portion of a left half of the case 40 shown in FIG. 2. Specifically, the slit 45 is formed in the portion of the case 40, which is located on the side where the end surface 13b of the rotor 10 is placed. As shown in FIGS. 3 and 4, the slit 45 is a gap, which is elongated in one direction and extends in the axial direction of the central axis CL of the case 40 from the one end 43 to the other end 44 of the case 40. As shown in FIGS. 3 and 5, the slit 45 is a space that is defined by two end parts 45a, 45b of the case 40, which are opposite to each other in a circumferential direction of the case 40, so that the slit 45 is formed by the end parts 45a, 45b.

In the present embodiment, as shown in FIG. 2, only a corresponding extent of the case 40, in which the slit 45 is formed, is exposed from the resin member 37, and the remaining extent of the case 40, which is other than the extent of the case 40, in which the slit 45 is formed, is covered with the resin member 37. The extent of the case 40, in which the slit 45 is formed, is an extent R1 between the two end parts 45a, 45b of the case 40 in the circumferential direction of the case 40. As discussed above, since the slit 45 is not closed with the resin member 37, the radiant heat, which is generated by the friction surface 13a of the rotor 10, i.e., the radiant heat, which is generated through the slipping between the armature 20 and the rotor 10 upon occurrence of the locking of the compressor 2 at the time of supplying the electric power to the electromagnetic coil 36, can be introduced into the inside of the case 40 through the slit 45. In the present embodiment, the entire extent of the slit 45 is not closed with the resin member 37. However, the present disclosure should not be limited to this construction. It is only required that at least a portion of the slit 45 is not closed with the resin member 37 to enable introduction of the radiant heat into the inside of the case 40 through the slit 45.

The case 40 is made of metal or ceramic. Regardless of the material of the case 40, the inner wall surface 41 reflects the radiant heat. However, in order to facilitate the reflection of the radiant heat from the inner wall surface 41, it is preferred that a color of the inner wall surface 41 is a highly reflective color, which effectively reflects the radiant heat, to facilitate the reflection of the radiant heat at the inner wall surface 41.

Here, it should be noted that the radiant heat is a type of electromagnetic wave. The endothermicity of the material, against which the radiant heat is applied, is increased when the absorption spectrum value in the wavelength range (0.1 μm to 0.1 mm) of the radiant heat is increased. When the color of the material becomes closer to black, the absorption spectrum value is increased, thereby resulting in the better heat absorbance property of the material with respect to the radiant heat. In contrast, when the color of the material is close to white or a metallic luster color, the heat reflectance property of the material with respect to the radiant heat is increased. Thus, it is desirable that the portion of the case 40, which forms the inner wall surface 41, is made of a metal material, which has the metallic luster color, or a non-metallic material, which has the white color.

For example, the case 40 may be made of metal, such as aluminum or brass. In this way, the inner wall surface 41 of the case 40 can have the metallic luster color that can easily reflect the radiant heat. Alternatively, the case 40 itself may be made of a non-metallic material, such as ceramic or highly-heat-resistant resin, which has the white color. Further alternatively, the case 40 itself may be made of a non-metallic material, which has a color that is other than the white color, and a coating film, which has the white color, may be formed in the inside of the case 40. In this way, the inner wall surface 41 of the case 40 can have the white color that can easily reflect the radiant heat. The coating film, which has the white color, can be formed by using a paint made of a ceramic material that has the white color.

The thermal fuse 35 contacts an opposite portion of the inner wall surface 41 of the case 40, which is opposite from the slit 45, at a predetermined contact pressure. The predetermined contact pressure of the thermal fuse 35 is generated by a resilient force of the lead wires 35b. Specifically, in the present embodiment, the case 40 and a portion (see FIGS. 3 and 4) of each lead wire 35b of the thermal fuse 35 located at the outside of the case 40 are held by the resin member 37. At this time, the thermal fuse 35 and the case 40 are positioned such that the lead wires 35b of the thermal fuse 35 are resiliently deformed to generate the urging force for urging the main body portion 35a against the inner wall surface 41 of the case 40. In this way, the thermal fuse 35 contacts the inner wall surface 41 of the case 40 at the predetermined contact pressure.

In the present embodiment, the thermal fuse 35 and the inner wall surface 41 of the case 40 are not directly fixed with each other. Alternatively, the thermal fuse 35 and the inner wall surface 41 of the case 40 may be directly fixed with each other.

Next, a main feature of the present embodiment will be described.

Figure 6:
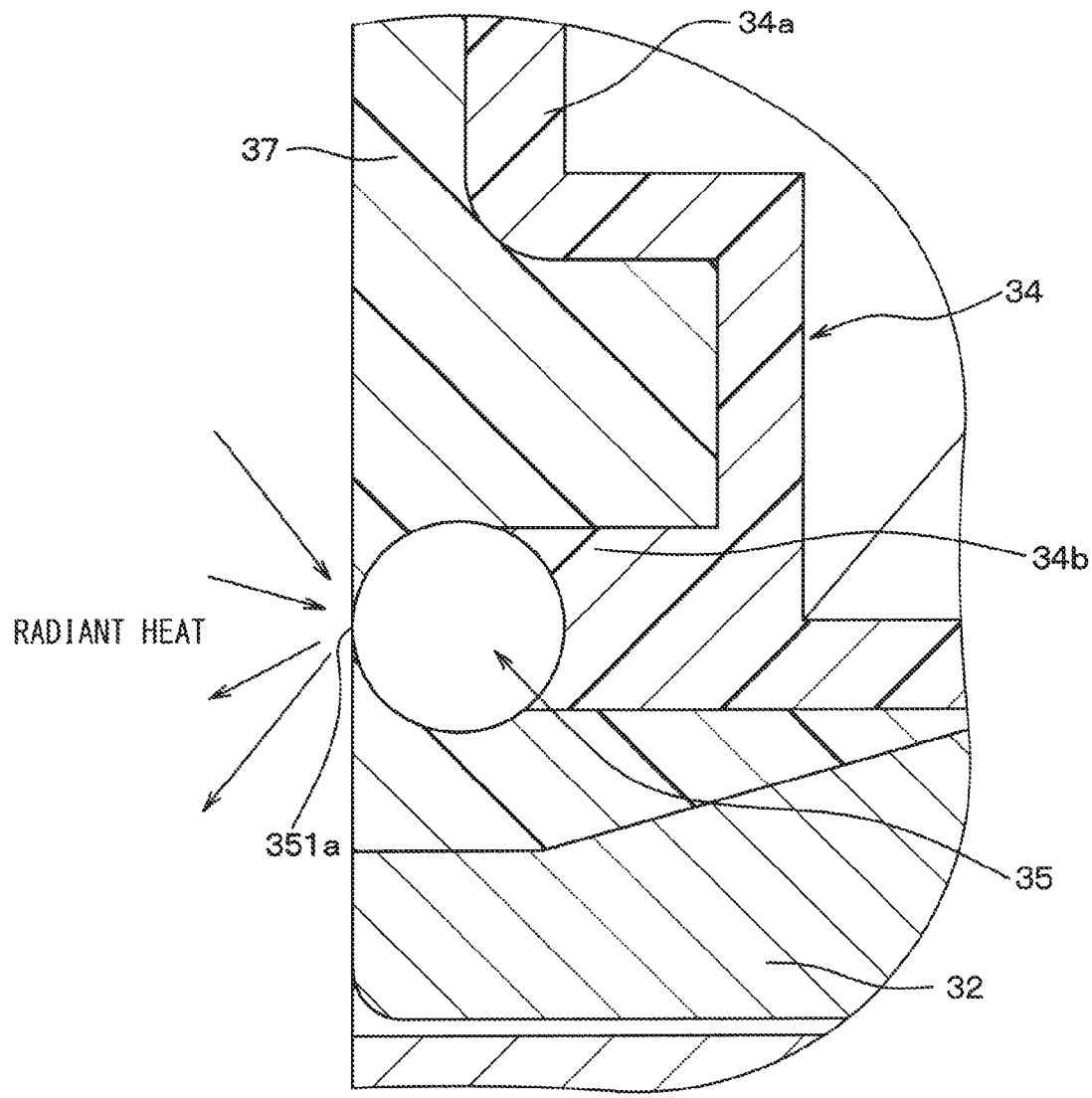
FIG. 6 is a partial enlarged cross sectional view of an electromagnetic clutch in a first comparative example.

A first comparative example shown in FIG. 6 is one example of a previously proposed technique. In the first comparative example, unlike the electromagnetic clutch 1 of the present embodiment, the case 40, which covers the thermal fuse 35, is not used, and the thermal fuse 35 is directly covered with the resin member 37. In the first comparative example, a portion 351a of the thermal fuse 35 is exposed from the resin member 37 to enable reaching of the radiant heat to the thermal fuse 35.

However, when the radiant heat reaches the exposed portion 351a of the thermal fuse 35, all of the radiant heat is not absorbed by the thermal fuse 35. Rather, a portion of the radiant heat is reflected by the thermal fuse 35 and is thereby escaped from the thermal fuse 35. Particularly, in a case where the outer surface of the thermal fuse 35 has the white color or the metallic luster color, the reflectance of the radiant heat becomes high. Therefore, a majority of the radiant heat is reflected by the thermal fuse 35 and is thereby escaped from the thermal fuse 35.

In contrast, in the present embodiment, the thermal fuse 35 is covered with the case 40. Therefore, as indicated by arrows in FIG. 2, the radiant heat, which is inputted into the inside of the case 40 through the slit 45 of the case 40 and is reflected by the thermal fuse 35 after reaching the thermal fuse 35, is reflected by the inner wall surface 41 of the case 40 and reaches the thermal fuse 35 once again. By repeating the reflection of the radiant heat at the thermal fuse 35 and the reflection of the radiant heat at the inner wall surface 41 of the case 40, the radiant heat is finally absorbed by the thermal fuse 35. As discussed above, in the present embodiment, the thermal fuse 35 is heated by a technique known as a cavity heating method. The cavity heating method is a method for heating a heating subject, which is placed in an inside of a cavity, by containing a light in the inside of the cavity.

Thus, according to the present embodiment, the radiant heat, which is once reflected by the thermal fuse 35, can be absorbed by the thermal fuse 35 without letting the radiant heat to escape from the thermal fuse 35. Therefore, in comparison to the first comparative example, in which the radiant heat reflected by the thermal fuse 35 is escaped from the thermal fuse 35, the responsiveness of the thermal fuse 35 can be improved.

According to the present embodiment, the radiant heat, which reaches the slit 45 of the case 40, is inputted into the inside of the case 40 through the slit 45 and reaches the thermal fuse 35 and the inner wall surface 41 of the case 40. The radiant heat repeats the reflection at the thermal fuse 35 and the inner wall surface 41 of the case 40 in the inside of the case 40, so that the radiant heat is finally absorbed by the thermal fuse 35. At this time, the radiant heat is directly absorbed by the thermal fuse 35 and is also indirectly absorbed by the thermal fuse 35. Specifically, the case 40 absorbs the radiant heat, and this absorbed heat is transferred from the case 40 to the thermal fuse 35 through heat conduction or heat convection.

Second Embodiment

Figure 7:
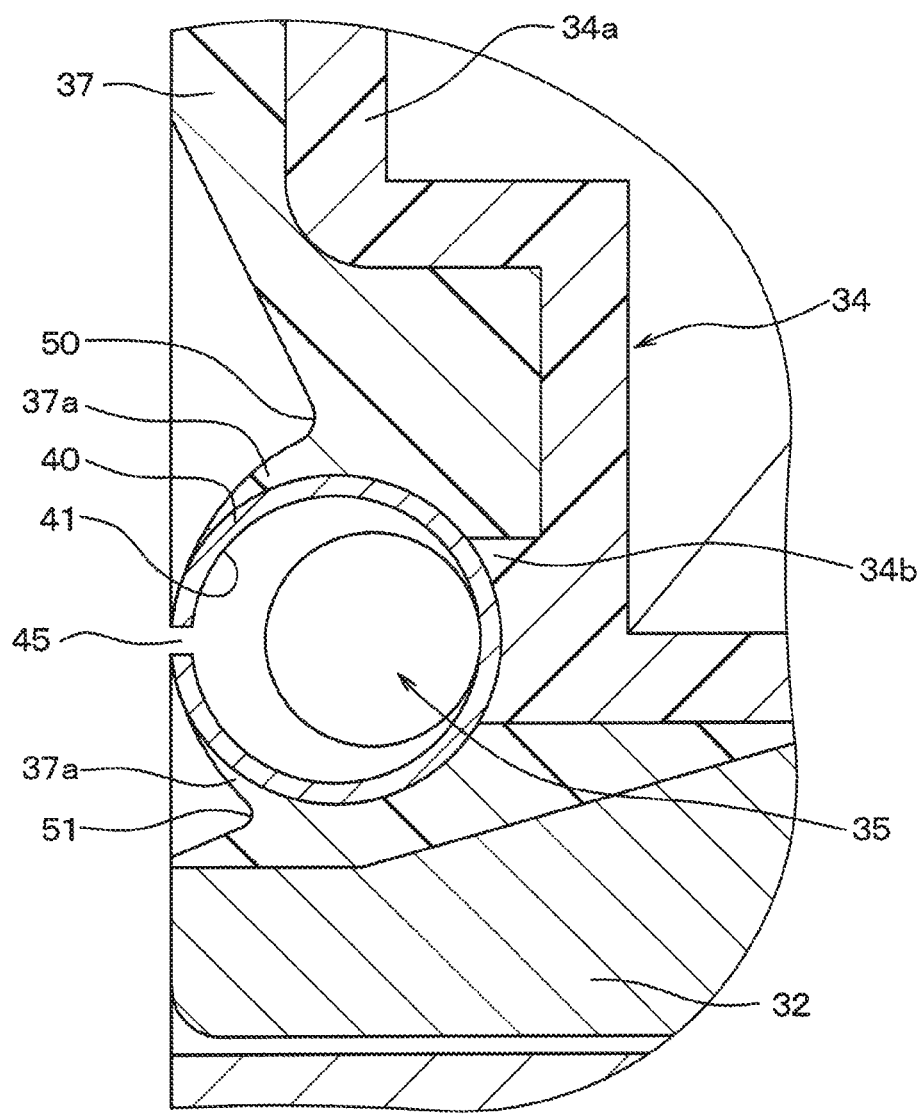
FIG. 7 is a partial enlarged cross sectional view of an electromagnetic clutch in a second embodiment.

As shown in FIG. 7, according to the present embodiment, the electromagnetic clutch 1 of the first embodiment is modified such that the surface configuration of the resin member 37 is modified into a form that is similar to the patent literature 1.

Specifically, according to the present embodiment, in a surface of a portion of the resin member 37, which is located on the side (the left side in FIG. 7) where the end surface 13*b* of the rotor 10 is placed, recesses 50, 51 are formed at predetermined locations, respectively, of the surface of the portion of the resin member 37 that are adjacent to the case 40. The case 40 is covered with thin film portions 37*a* of the resin member 37, each of which is placed between the case 40 and a corresponding one of the recesses 50, 51.

As discussed above, according to the present embodiment, the recesses 50, 51 are formed at the surface of the portion of the resin member 37, and thereby spaces are formed at the corresponding locations, which are adjacent to the case 40. Thus, paths, along which the radiant heat can be easily conducted, are provided. Furthermore, the thickness of the resin member 37, which covers the case 40, is set to be smaller than that of the first embodiment. Thereby, when the radiant heat is absorbed by the resin member 37, the absorbed heat can be quickly conducted from the resin member 37 to the case 40. The radiant heat is conducted from the surface of the resin member 37 to the thermal fuse 35 through the case 40.

In this way, according to the present embodiment, the responsiveness of the thermal fuse 35 can be improved in comparison to the first embodiment.

Third Embodiment

Figure 8:
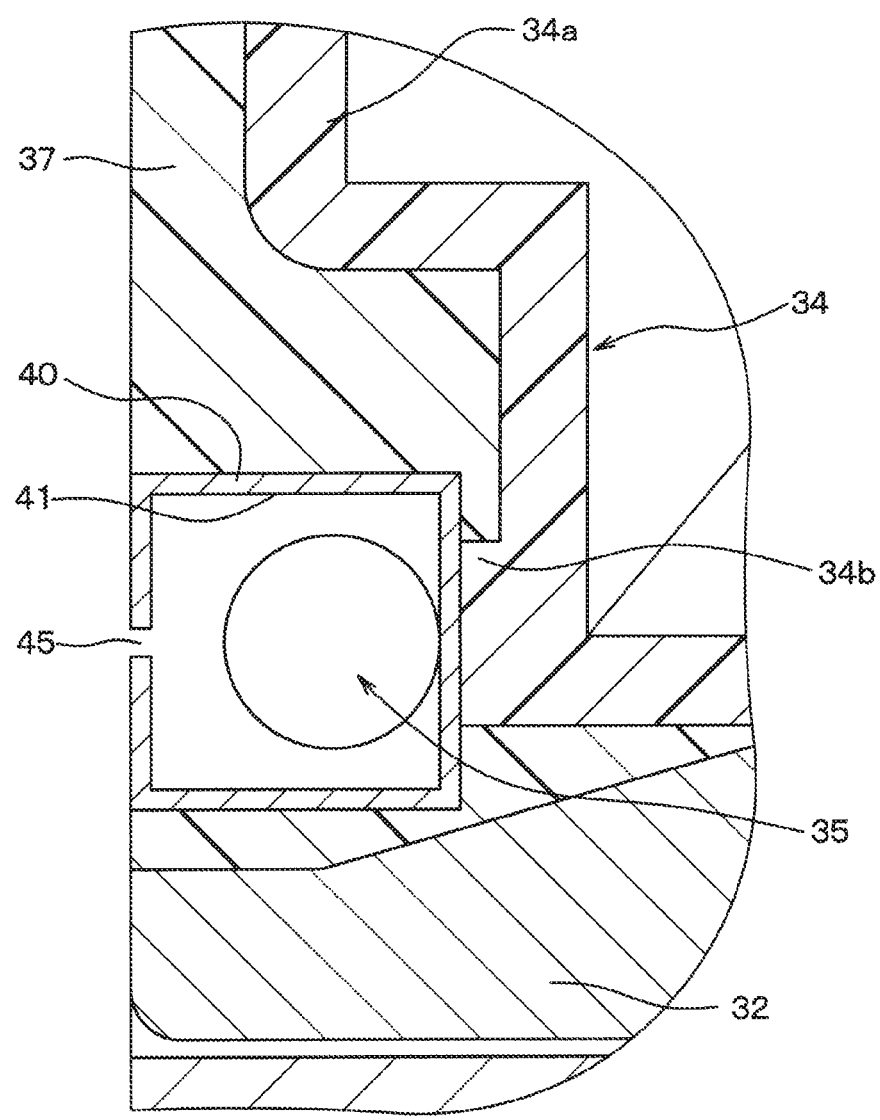
FIG. 8 is a partial enlarged cross sectional view of an electromagnetic clutch in a third embodiment.

As shown in FIG. 8, according to the present embodiment, the electromagnetic clutch 1 of the first embodiment is modified by changing the shape of the case 40.

That is, in the present embodiment, the case 40 is shaped into a rectangular tubular form having a rectangular cross section. Even when the shape of the cross section of the case 40 is changed in this way, the advantages, which are similar to those of the first embodiment, can be achieved.

The shape of the case 40 can be changed to any other shape that is other than those of the first and third embodiments as long as the case 40 covers the thermal fuse 35.

Furthermore, in the present embodiment, the surface of the case 40, which is closest to the side (the left side in FIG. 8) where the end surface 13*b* of the rotor 10 is placed, is entirely exposed from the resin member 37. Even in the present embodiment, the slit 45 is not covered with the resin member 37, so that the radiant heat can be introduced into the inside of the case 40 through the slit 45. Specifically, according to the present embodiment, it is only required that the radiant heat can be introduced into the inside of the case 40. Thus, it is only required that at least a portion of the slit 45 is not closed.

Other Embodiments

The present disclosure should not be limited to the above embodiments, and the above embodiments may be modified in various ways within a scope of the present disclosure, as described below.

(1) In each of the above embodiments, the thermal fuse 35 of the fusible alloy type is used. The present disclosure is also applicable to a case where a thermal fuse of a thermal pellet type is used in place of the thermal fuse of the fusible alloy type. When the thermal pellet melts, the thermal fuse of the thermal pellet type cuts the supply of the electric current, i.e., the thermal fuse is melted and is thereby open-circuited.

(2) In each of the above embodiments, the length of the slit 45, which extends in the axial direction of the central axis, is set to be the same as the length of the case 40. Alternatively, the length of the slit 45, which extends in the axial direction of the central axis, may be set to be shorter than the length of the case 40. Furthermore, in each of the above embodiments, the slit 45 is formed in the case 40. Alternatively, in place of the slit 45, a gap, which is shaped into another form, such as a circle or a square, that allows input of the radiant heat into the inside of the case 40, may be formed in the case 40.

(3) The above embodiments are not irrelevant to each other and may be combined in any appropriate combination unless such a combination is obviously impossible. Furthermore, in each of the above embodiments, the respective components of the embodiment are not necessarily indispensable unless it is specifically stated that the component(s) is indispensable or it is conceivable that the component(s) is obviously indispensable.

The invention claimed is:

1. An electromagnetic clutch comprising:
   an electromagnetic coil that generates an electromagnetic attractive force when the electromagnetic coil is energized;
   a rotor that is rotated about a rotation center axis when the rotor receives a rotational drive force from a drive source, wherein the rotors includes a first surface and a second surface, which are spaced away from each other in an axial direction of the rotation center axis, and the first surface and the second surface extend in a direction perpendicular to the axial direction;
   an armature that is connectable with a rotatable shaft of a driven-side device, wherein the armature is attracted to and attached to the first surface of the rotor by the electromagnetic attractive force when the electromagnetic coil is energized, and the armature is detached from the first surface of the rotor when the electromagnetic coil is not energized;
   a stator that is opposed to the second surface of the rotor in the axial direction and forms a space between the stator and the second surface, wherein the stator has an opening on a side wherein the second surface is located, and the stator receives the electromagnetic coil in an inside space of the stator, which is communicated with the opening;
   a resin member that closes the opening of the stator and seals the electromagnetic coil in the inside space of the stator;
   a case that is held by a portion of the resin member, which is located in the opening of the stator; and
   a thermal fuse that is received in an inside of the case and cuts supply of an electric current to the electromagnetic coil when a temperature of the thermal fuse equal to or higher than a predetermined temperature, wherein:
   the case has a gap, through which radiant heat generated at the first surface is introduced into the inside of the case;
   a capacity of the case is larger than a volume of the thermal fuse; and
   the case has a space that is formed between an inner wall surface of the case and the thermal fuse.

2. The electromagnetic clutch according to claim 1, wherein:
   the thermal fuse includes:
      a main body portion; and
      a lead wire, which electrically connects between the main body portion and the electromagnetic coil;
   a portion of the lead wires, which is placed at an outside of the case, is held by the resin member; and
   the thermal fuse contacts the inner wall surface of the case with a predetermined contact pressure, which is generated by a resilient force of the lead wire.

3. The electromagnetic clutch according to claim 1, wherein a portion of the case, which forms the inner wall surface of the case, is made of a metal material that has a metallic luster color.

4. The electromagnetic clutch according to claim 1, wherein a portion of the case, which forms the inner wall surface of the case, is made of a non-metallic material having a white color.

5. The electromagnetic clutch according to claim 1, wherein the inner wall surface of the case is in a form of a recessed curved surface.

6. The electromagnetic clutch according to claim 1, wherein:
   the case is in a cylindrical tubular form and is opened at both of one end and another end of the case along a direction of a central axis of the case; and
   the gap is a slit that extends along the direction of the central axis.

7. An electromagnetic clutch comprising:
   an electromagnetic coil that generates an electromagnetic attractive force when the electromagnetic coil is energized;
   a rotor that is rotated about a rotation center axis when the rotor receives a rotational drive force from a drive source, wherein the rotor includes a first surface and a second surface, which are spaced away from each other in an axial direction of the rotation center axis, and the first surface and the second surface extend in a direction perpendicular to the axial direction;
   an armature that is connectable with a rotatable shaft of a driven-side device, wherein the armature is attracted to and attached to the first surface of the rotor by the electromagnetic attractive force when the electromagnetic coil is energized, and the armature is detached from the first surface of the rotor when the electromagnetic coil is not energized;
   a stator that is opposed to the second surface of the rotor in the axial direction and forms a space between the stator and the second surface, wherein the stator has an opening on a side wherein the second surface is located, and the stator receives the electromagnetic coil in an inside space of the stator, which is communicated with the opening;
   a resin member that closes the opening of the stators and seals the electromagnetic coil in the inside space of the stator;
   a case that is held by a portion of the resin member, which is located in the opening of the stator; and
   a thermal fuse that is received in an inside of the case and cuts supply of an electric current to the electromagnetic coil when a temperature of the thermal fuse is equal to or higher than a predetermined temperature, wherein:
   the case has a gap, through which radiant heat generated by slipping between the armature and the rotor at a time of occurrence of locking of the driven-side device during energization of the electromagnetic coil is introduced into the inside of the case;
   a capacity of the case is larger than a volume of the thermal fuse; and
   the case has a space between an inner wall surface of the case and the thermal fuse.

* * * * *